Figure 1:
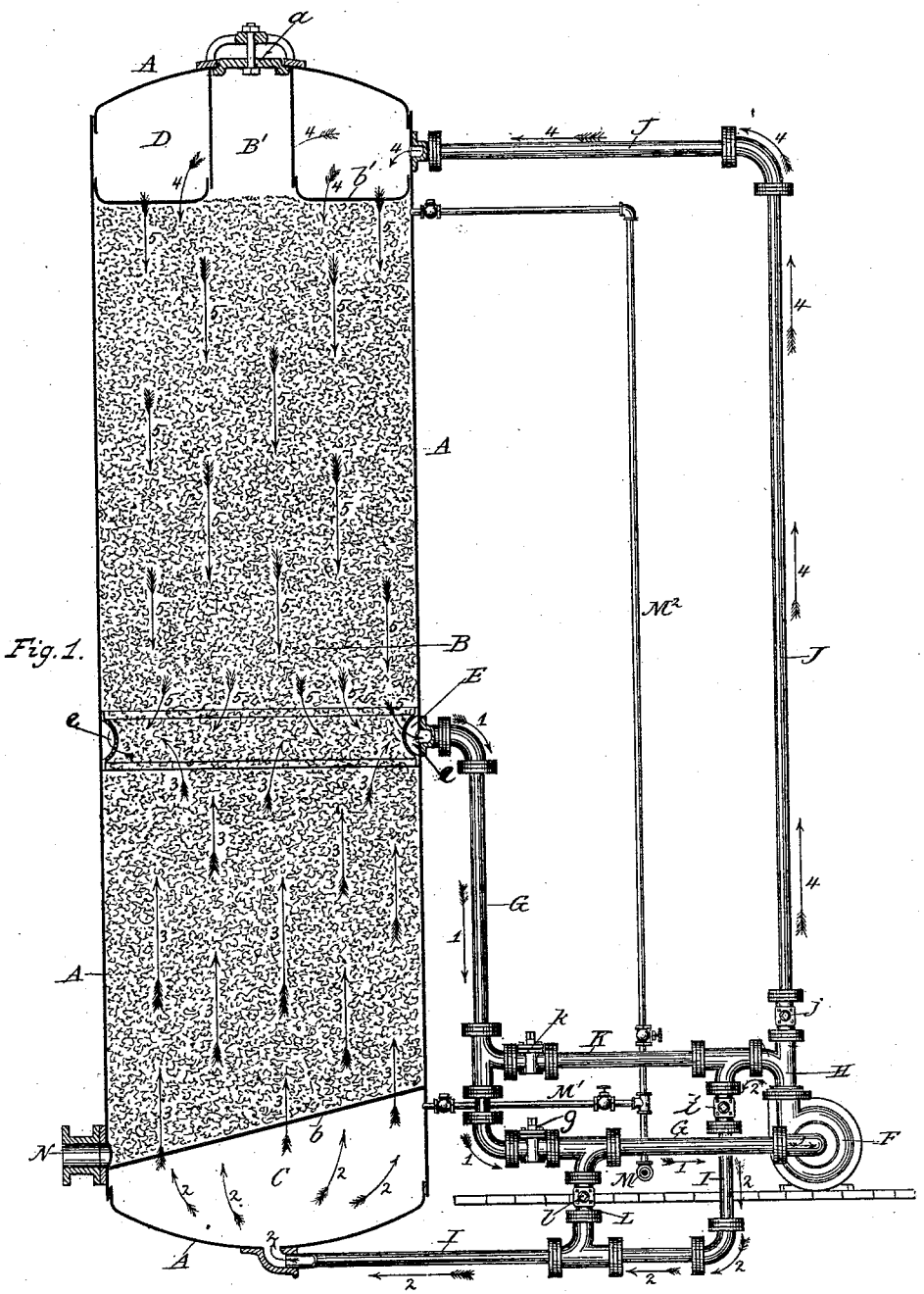

(No Model.) 3 Sheets—Sheet 1.

A. SELKIRK.
PROCESS OF DISINTEGRATING VEGETABLE SUBSTANCES.

No. 487,782. Patented Dec. 13, 1892.

(No Model.) 3 Sheets—Sheet 2.

A. SELKIRK.
PROCESS OF DISINTEGRATING VEGETABLE SUBSTANCES.

No. 487,782. Patented Dec. 13, 1892.

Witnesses: Charles Selkirk, Frank Selkirk

Alexander Selkirk
Inventor.

(No Model.) 3 Sheets—Sheet 3.

A. SELKIRK.
PROCESS OF DISINTEGRATING VEGETABLE SUBSTANCES.

No. 487,782. Patented Dec. 13, 1892.

Witnesses:
Charles Selkirk
Frank Selkirk

Alexander Selkirk
Inventor.

UNITED STATES PATENT OFFICE.

ALEXANDER SELKIRK, OF ALBANY, ASSIGNOR, BY MESNE ASSIGNMENTS, TO ROBERT WHITEHILL AND DANIEL S. WARING, OF NEWBURG, NEW YORK.

PROCESS OF DISINTEGRATING VEGETABLE SUBSTANCES.

SPECIFICATION forming part of Letters Patent No. 487,782, dated December 13, 1892.

Application filed August 4, 1888. Serial No. 282,012. (No specimens.) Patented in Germany August 15, 1888, No. 46,940; in England August 16, 1888, No. 11,848; in France August 16, 1888, No. 192,466; in Belgium August 16, 1888, No. 82,939; in Norway August 20, 1888, No. 1,043; in Sweden August 21, 1888, No. 1,900, and in Austria-Hungary February 20, 1889, No. 33,742 and No. 54,310.

*To all whom it may concern:*

Be it known that I, ALEXANDER SELKIRK, a citizen of the United States, residing at Albany, in the county of Albany and State of New York, have invented a new and useful Improvement in Processes of Disintegrating Vegetable Substances, (for which I have obtained Letters Patent in Great Britain, dated August 16, 1888, No. 11,848; in Austria-Hungary, No. 33,742 and No. 54,310, dated February 20, 1889; in Germany, No. 46,940, dated August 15, 1888; in France, No. 192,466, dated August 16, 1888; in Belgium, No. 82,939, dated August 16, 1888; in Norway, No. 1,043, dated August 20, 1888, and in Sweden, No. 1,900, dated August 21, 1888,) of which the following is a full, clear, and exact description.

My invention relates to a process for the reduction of vegetable substances to fiber, &c., by use of alkaline cooking liquors, in which the cooking liquor will have while highly heated a dual circulation through the charge of vegetable substances, being treated by two currents of the liquor simultaneously entering the charge from its opposite ends and moving toward each other in their respective passages through the interstices between the numerous particles or pieces of the materials in the respective half portions of the charge, then emerging together laterally all around from at about the middle of the same to be reheated and returned into the charge from its opposite ends to have the same dual circulation through its respective parts, as before.

Heretofore in the treatment by use of cooking liquors of vegetable substances for their reduction to fiber the materials in some cases have been simply boiled in the cooking liquor within open vessels, and were thereby only softened preparatory to being subjected to the mechanical action of heating-machines.

In another process the materials to be reduced are introduced into a close or steam-tight rotary vessel with the cooking liquor partly filling the same and with live steam introduced within the charge to heat the liquor in the same while the vessel is being slowly revolved. In this process of treatment of the materials the cooking liquor is not circulated through the body of the charge of materials, but the mass of materials in the charge is only gradually shifted within the chamber of the vessel to effect a submergence of the outlying portions not previously covered by the liquor, and also to effect a progressive changing of place of the outer portions of the rotating charge from one plane to another, so that all the outer portions of the body of the materials will be similarly heated and acted upon by the cooking liquor while the latter is being gradually reduced in strength by reason of the continual condensation of the live steam within the charge.

In another old process the materials to be reduced are contained within a steam-tight upright tubular vessel, with the cooking liquor nearly filling the same and with the charge supported by a perforated bottom, through which the liquor has passage from the chamber containing the material as it is being drawn by a pump from the lower end of the digesting-vessel and forced into the upper end of the same, to circulate thence downwardly through the entire length of the body of the charge, to be again withdrawn from its lower end and returned into it from its upper end so long as the pump is made to circulate the liquor. In this old process the liquor is generally forced by the pump through a heater and heated before its return into the upper end of the body of the material. One great defect attending this old process is that the circulation of the liquor through the heating apparatus and thence downwardly through the body of the charge can be continued only until the materials have been softened, as by the united action of the draft of the pump and pressure on the charge the softened materials will become packed on the perforated bottom. Therefore the circulation of the liquor through both the heater and the material being treated is required to be stopped before the cooking of the material is half completed, and live steam must of necessity be introduced within the charge to maintain the temperature necessary to be had for completing the cooking of the same. Another disadvantage attending this old process is that in all the time the liquor is being circulated through the heater and body of the material the upper end portion of the latter will be heated to a greatly-higher temperature than the lower end portion of the same, and consequently when the materials comprising the upper end portion of the charge are fully cooked or reduced the lower end portion will be only partly reduced, so that the time of cooking must be prolonged to effect a proper reduction of the materials in the lower end of the charge, when this prolongation of the cooking will effect an overcooking of the material of the upper end portion to an injury to the product. A further disadvantage attending the use of this old process is that before the materials have been half reduced under the operation of the liquor and heat the stoppage of the circulation necessitates the use of live steam within the body of the charge, while the steam by condensation increases the volume of the liquor and also reduces its strength, so as to necessitate a prolongation of the cooking for a time greater than would be required were the strength of the liquor as at first.

In another old process the cooking liquor is circulated through the charge of material as it is confined within a vessel similar to that used for the practice of the process last above referred to, with the difference that the circulation of the liquor is made to be alternately downwardly and upwardly through the body of the charge, with the change of the direction of circulation from down to up made as often as the packing of the material on the lower perforated bottom occurs and the change of direction of circulation from up to down made as often as by the draft of the pump and the pressure on the charge causes the materials to pack upwardly against the upper end strainer of the digesting-vessel. The disadvantageous results attending this process of alternate circulation, up and down, of the liquor through the charge are that the reduction of the material in both the upper and lower portions of the same, and the progress of the reduction of the material in those end portions will be more rapidly advanced toward completion than is the material in the middle portion of the charge. This unequal progress of reduction of the material in the charge necessitates such a longer time of treatment of all the material therein as will be sufficient to effect a complete reduction of the middle portion of the charge, and consequently the end portions of the charge will become overcooked before its middle portion is fully reduced, and as a further consequence a considerable portion of the fiber from the earlier reduced material in the end portions of the charge will be drawn out of the digesting-vessel through both the upper and lower strainers by the draft of the pump and be substantially lost.

In another process the liquor is intermittently drawn from the lower ends of the digesting-vessel and forced into a reservoir above and connecting with the upper end of the same, from which reservoir (as often as it is filled) the liquor is allowed to flow back by gravity or other force into the digesting-vessel to act on the materials within, while steam entering centrally through the bottom of the vessel is intended to heat the liquor and force it, when heated, upwardly through the materials more central in the charge to the top of the same, when the liquor, cooling, will be carried downwardly through the outer portions of the charge and by the force of the pump or pumps have passage out through the perforated plates supporting the materials from contact with the sides of the vessel, and as a consequence the materials in the central portion of the charge are more rapidly acted on and is sooner reduced than the outer portions of the same, and because of this unequal heating of the portions of the charge of materials the materials more centrally in the charge will become overcooked before the outer portions of the same have been fully reduced.

One serious defect common in all these old processes, as above described, is that they cannot be employed for economically reducing sawdust to chemical fiber or for dissolving the hulls of cotton-seed for separation of cotton therefrom or for disintegrating stalks of sorghum, sugar-cane, and other plants of the sorghum genus in which the pith forms a large portion of the fiber in those plants, because from these several kinds of materials the finer portions of the same will be readily drawn by the force of the pump or pumps through the perforations in the strainer-plates at the end or ends of the digesting-chamber into the pipes, while the coarser portions of the same will after a time close the perforations in said plates to such a degree as to retard the circulation of the liquor or to prevent the same.

By the practice of my process of dual circulation of the cooking liquor through the body of the materials in the charge the several disadvantageous results attending the practices of these old processes alluded to are wholly avoided and the defects common in them are wholly overcome, so that all kinds and classes of vegetable substances containing fiber can be reduced to chemical fiber or disintegrated by the employment of a much less volume of liquor (proportionate to the quantity of material treated) than heretofore used, while the heated liquor can be continuously circulated from the beginning to the ending of the cooking of the charge without any loss of fiber and with all portions of the material in the charge being kept at about the same uniform degree of temperature, so that an even or uniform reduction or disintegration of all the particles of the material in the charge will occur throughout all portions of the digesting-chamber.

In the practice of this new improvement in the process of disintegrating vegetable substances I use any suitable steam-tight digesting-vessel which will stand an internal pressure of from fifty to one hundred and twenty pounds per square inch, as the character of the materials to be treated may require for its complete disintegration or the dissolving of its soluble portions. The digesting-chamber of this vessel is filled with the material to be treated, and it also receives the cooking liquor to be employed as a reducing agent in such a quantity as will be sufficient to saturate all the particles of the materials comprising the body of the charge and submerge only about the lower half portion of the same. This body of materials is confined at its ends within the digesting-chamber between two perforated plates, which admit the cooking liquor to freely pass into it from adjoining end liquor-chambers, while the middle portion of the body of the charge is confined within an annular perforated wall or a zone of straining material, which prevents the passage of the particles of the charge from the digesting-chamber and admits the liquor to freely pass out laterally all around from the middle portion of this body of the material treated. The body of the material, (composing the charge to be disintegrated,) being confined within the digesting-chamber under the conditions above described and with all its particles saturated and about only its lower half portion submerged in the same, will have its cooking liquor heated and continuously circulated through it in two separate and distinct currents. These currents respectively enter the body of this charge of material from the opposite ends thereof after their passage into the digesting-chamber from its adjoining end liquor-chambers and are simultaneously circulated through the interstices between the particles composing the respective half portions of the body of the material as these currents move toward each other and to the middle of the body of the charge, where the liquors from these two currents mingle and pass out laterally together all around from the body of the charge to be reheated and recirculated in dual currents, as before. This dual circulation of the cooking liquor by its two distinct and separate currents through the respective half portions of the body of the material in direction toward each other and laterally out from the middle of the charge is effected by positive mechanical means, and preferably by means of a suitable pump and such a system of pipes as will connect the pump with the digesting-vessel, so as to draw the liquor laterally away from the middle of the digesting-chamber and return it in two streams reheated (or to be reheated) into the opposite ends of the said chamber to circulate as dual currents toward each other through the respective half portions of the charge, as before stated.

In order that the nature of my improved process may be fully understood, I have shown in the accompanying drawings and will hereinafter describe some preferred forms of digesting apparatus in which the process may be conveniently carried out, such apparatus forming no part of the invention herein claimed, various parts thereof and combinations of the same being the subjects of separate applications for Letters Patent, Serial No. 301,877, filed March 5, 1889, and Serial Nos. 312,749 and 312,750, filed May 31, 1889, and are herein described merely for the purpose of furnishing a full and clear disclosure of the process and how the same may be carried out.

Figure 2:
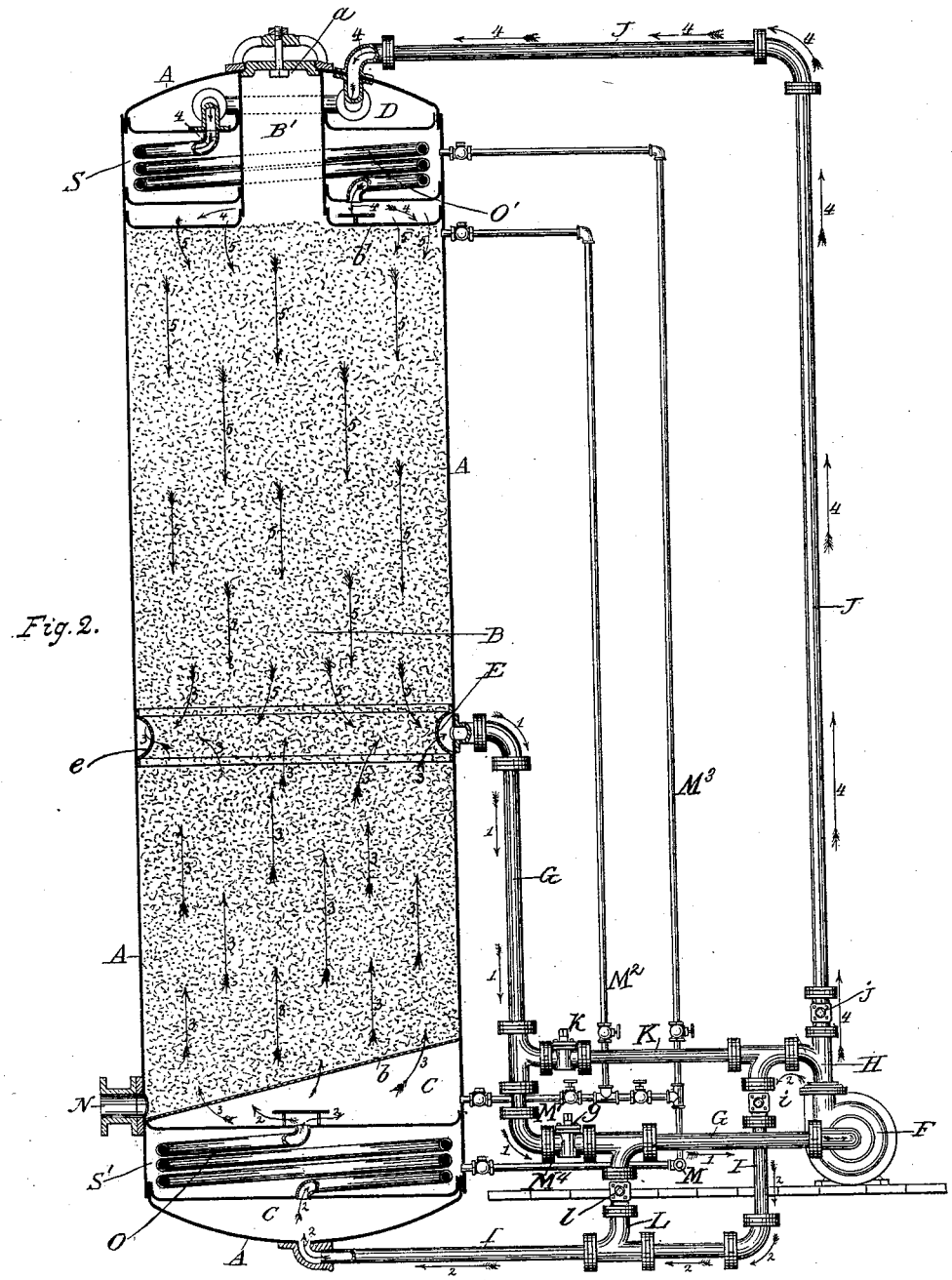
Figure 3:
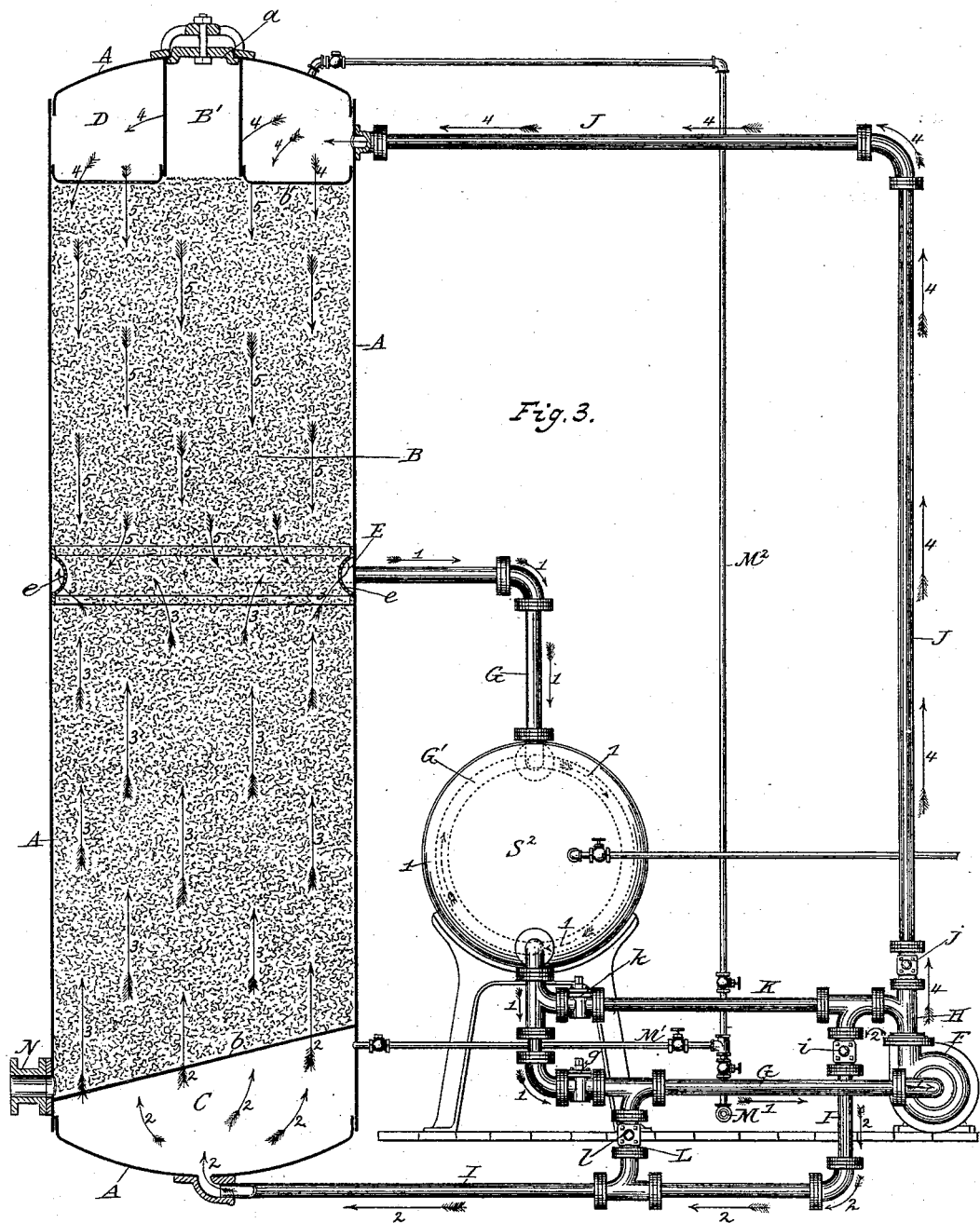

In the drawings, Figure 1 is a sectional view of a digesting apparatus of suitable construction for the economical practice of this process and illustrates means for heating the liquor by the use of live steam. Fig. 2 is a view of a similar digesting apparatus and also illustrates an interior liquor-heating device which can be employed with the same. Fig. 3 is another sectional view of a digesting apparatus having the means for heating the cooking liquor situated exterior to the digesting-vessel.

The same letters of reference indicate similar parts or elements throughout the several views.

A is a digesting-vessel, which is suitably constructed of iron or steel plates and made steam-tight and strong to resist an internal pressure of from thirty to one hundred and twenty pounds (more or less) per square inch, as may be required by the character of the vegetable substances to be treated in this process, and B is a digesting-chamber for holding the same while being disintegrated.

C and D, respectively, are liquor-chambers, one at the upper end of the digesting-chamber and the other at its lower end. These liquor-chambers are separated from the said digesting-chamber by perforated plates or devices $b$ $b'$, respectively. A suitable passageway B' is provided through the upper head of the vessel A and the liquor-chamber D for the introduction of the material to within the chamber B. This opening is closed by a suitable manhole-cover $a$, secured in place by any known means.

E is an annular chamber arranged at about the middle of the digesting-vessel and contained between the side wall of the latter and the perforated annular plate or strainer $e$, through which communication is had from the digesting-chamber to said liquor-chamber E.

F is a pump of any suitable form of construction for producing a continuous draft of the cooking liquor from the digesting-vessel and returning it into the same. This pump is located at any place conveniently near the digesting-vessel and is operated by steam or other suitable power.

G is a draft-pipe leading from the annular liquor-chamber E to the inlet of the pump F, as indicated by arrow 1 in the several figures. This pipe G is provided with a valve $g$ at any convenient place in its course.

H is a branch discharge-pipe communicating with the discharge or outlet of the pump.

I is a pipe communicating from one of the branches of branch pipe H to the liquor-chamber C and is provided in its course with a valve $i$.

J is a second pipe leading from branch pipe H and communicating to the liquor-chamber D and is provided with a valve $j$.

K is a pipe communicating, also, from branch pipe H to pipe G and is provided with a valve $k$.

L is a pipe communicating from pipe I to pipe G and is provided with a valve $l$.

M is a live-steam pipe leading from any convenient source of steam to near the digesting-chamber, and $M'$ and $M^2$ are branch steam-pipes leading, respectively, from the steam-pipe M to the upper and lower ends of the digesting-vessel. These live-steam-supply-pipes are each provided with a suitable valve controlled by the operator and also with suitable check-valves.

N is a blow-off pipe for the discharge of the cooked product from the digesting-chamber and is provided with a suitable blow-off valve. (Not shown.)

In Fig. 1 the means for heating the liquor is shown to be the steam-pipes above described for admitting live steam directly into the digesting-vessel to be mingled with the treating-liquor circulating therein. This means for heating the treating-liquor by live steam is old and can be used, if preferred, yet it is recommended that in most cases the liquor be heated by a suitable liquor-heating apparatus, so that condensation of the steam within the digesting-chamber and a decrease of the strength of the liquor will be prevented.

In Fig. 2 there is shown above the perforated plate $b'$ and within the liquor-chamber D, and also below the perforated plate $b$ and within the lower liquor-chamber C, the steam-chambers S and $S'$, respectively, which steam-chambers contain each a coil of liquor-circulating pipes, which receive the liquor at one end and discharge the same at the opposite end, as indicated by arrows. The steam-chambers S and $S'$, containing these liquor-heating-pipes, receive steam through any suitable steam-pipes, such as pipes $M^3$ and $M^4$ and branches of pipes M, and the digester may also, if desired, be provided with the pipes $M'$ and $M^2$, as shown, connected directly with it, as in the construction previously described.

In Fig. 3, $S^2$ represents a liquor-heating device situated exterior to the digesting-vessel and located in the course of the draft-pipe G, consisting of a chamber receiving steam from any suitable source and containing a liquor-circulating pipe or pipes $G'$, with which the portions of pipe G are connected by suitable couplings, so that when liquor is drawn from the digesting-vessel through pipe G it will pass into pipe $G'$ of the heating device, as indicated by dotted arrows 1 in said figure, and pass thence into the continuation of pipe G to the inlet of the pump, and in this passage of the liquor through pipe G and pipe $G'$ in the liquor-heating device the liquor will be heated and be then discharged into the digesting-vessel through pipes I and J in two separate and distinct streams and in the directions indicated by arrows 2 and 4, respectively. Although this heating device (shown in Fig. 3) can be used in the practice of this process for heating the cooking liquor, yet it forms no part of the invention covered in this case.

Any other suitable form of liquor-heating device can be employed as a substitute for the heating device illustrated for reheating the liquor after it is drawn from the digesting-vessel through pipe G and before it is returned into digesting-vessel in the two separate and distinct streams by the force of the pump and the pipes I and J, as before described.

When employing a digesting apparatus of the character illustrated in the drawings for the practice of this process, I preferably reduce the materials to be disintegrated, whether they be wood, grasses, straws, or fibers of flax, rags, old rope, baggings, or stalks of plants, to small pieces or chips or shreds by any suitable means, and then introduce the same into the digesting-chamber B until it is filled to its top. The cooking liquor is also introduced into the digesting-chamber in such a quantity as to thoroughly saturate all the particles of material in the charge and also submerge the lower half portion of the same up to a line a little above the plane of the outlet from the annular chamber E to the draft-pipe G. When the charging of the vessel has been completed, the manhole is closed, so as to render the vessel steam-tight. The pump will then be continuously operated, with the valves $k$ and $l$ closed and the valves $g$, $i$, and $j$ opened, when the liquor will be drawn from the digesting-chamber through the perforated wall $e$ into the annular chamber E, and thence through pipe G into the pump in direction of arrow 1, when the liquor will be discharged from the pump in two streams, one stream in direction of arrow 2, through pipe I, into the liquor-chamber C, to pass from thence upwardly into the digesting-chamber from its lower end to have passage in its upward circulation through the interstices between the particles of material in the lower half portion of the said digesting-chamber, as indicated by arrow 3, while the second stream of liquor from the pump will be discharged through pipe J into the upper liquor-chamber D, and from thence pass into the upper end of the digesting-chamber to be sprayed down on the materials below, and thence circulate downwardly through the interstices between the particles composing the upper half portion of the charge, as in direction of arrow 5, to opposite the annular liquor-chamber E, and at this point the liquor circulating downwardly will mingle with the liquor circulating upwardly, and both will be drawn together laterally all around into the said chamber E, and thence out by the pump through pipe G and be again circulated, as above described. In this dual circulation of the liquor through the body of the material in the digesting-chamber and from its opposite ends in two separate and distinct currents, which are toward each other and to the middle of the charge, the materials being treated will be held from having passage through the perforated plates b b', which separate them from the adjoining liquor-chambers, so that there will be no liability of the material, however fine it may be, escaping from the digesting-chamber through such perforated plates, as is the case with the older processes. By this dual circulation of the liquor (as by the two distinct and separate currents which are introduced at the opposite ends of the charge and move toward each other and to the middle of the digesting-chamber) the material at the middle of the digesting-chamber and opposite the annular liquor-chamber E will itself prevent the passage of the disintegrated matters out from the digesting-chamber, while at the same time the liquor will be permitted to pass out laterally all around from the material into the said annular chamber and into the draft-pipe G without any loss whatever of the finer portions of the material. When the cooking liquor is heated by being passed through any suitable device before its return into the digesting-chamber in the two separate and distinct streams or currents to have the dual circulation through the material, as above described, this liquor will be preserved at its normal strength throughout all the time of the treatment of the charge, and the liquor in its dual circulation from the heater will carry the heat taken up by it into the respective upper and lower half portions of the charge and so uniformly heat the same that the temperature of the materials in the charge will be about the same in all its portions, and the beginning and completion of the disintegration of all portions of the material will be effected at about the same time and without liability of any one portion being either overcooked or undercooked.

When liquor-heating devices are not used, but live steam is employed, I would make a cooking liquor of a greater strength than would be required when the liquor is heated by means of a liquor-heating device of the character shown in Figs. 2 or 3 or their well-known substitutes.

It is to be understood that in the practice of this process any of the various cooking liquors may be employed; but it is especially adapted to the use of a solution of caustic soda or potash or equivalent alkali or solution containing the same, many of which are well known, because solutions of alkaline character will form suds when agitated and introduced into the upper end portion of the digesting-chamber by the force of the pump, and these suds will cover the unsubmerged parts of the upper half portion of the charge and constantly wet the same with sufficient liquor for dissolving the soluble matters in the material comprising the said upper half portion at the same time the soluble matters of the materials in the lower half portion of the charge are dissolved by the action of the alkaline liquor submerging them.

Having described my invention, what I claim, and desire to secure by Letters Patent, is—

1. The process herein described of disintegrating vegetable substances, the same consisting in subjecting the substances within a steam-tight vessel and under pressure to the action of two currents of heated cooking liquor simultaneously and continuously circulated from the respective ends of the charge toward each other and the middle portion of the same, as described.

2. The process herein described of disintegrating vegetable substances, the same consisting in submerging about the lower half portions of the body of the charge of material in a cooking liquor of suitable strength, heating this liquor continuously and circulating it by two separate and distinct streams or currents, which are continuously introduced into the body of the charge from its opposite ends and circulated through the interstices between the particles in each half portion of the charge in directions toward each other and to a common outlet all around from about the middle of the charge, as described.

ALEXANDER SELKIRK.

Witnesses:
CHARLES SELKIRK,
FRANK E. SELKIRK.